US00RE47036E

(19) United States
(12) Reissued Patent
Batdorf

(10) Patent Number: US RE47,036 E
(45) Date of Reissued Patent: Sep. 11, 2018

(54) CABLE GUARD SYSTEM FOR ARCHERY BOWS

(71) Applicant: The Outdoor Group, LLC, West Henrietta, NY (US)

(72) Inventor: Richard Batdorf, Mt. Arlington, NJ (US)

(73) Assignee: Perfect Form Manufacturing, LLC, West Henrietta, NY (US)

(21) Appl. No.: 15/254,706

(22) Filed: Sep. 1, 2016

Related U.S. Patent Documents

Reissue of:
(64) Patent No.: 8,820,304
Issued: Sep. 2, 2014
Appl. No.: 13/226,827
Filed: Sep. 7, 2011

(51) Int. Cl.
*F41B 5/14* (2006.01)
*F41B 5/10* (2006.01)

(52) U.S. Cl.
CPC . *F41B 5/10* (2013.01); *F41B 5/14* (2013.01)

(58) Field of Classification Search
CPC ..... F41B 5/10
USPC ..... 124/25.6
See application file for complete search history.

(56) References Cited

U.S. PATENT DOCUMENTS 3,574,944 A * 4/1971 Reynolds ..... F41G 1/467 33/265
4,156,496 A * 5/1979 Stinson ..... F41B 5/066 124/25.7
4,207,858 A * 6/1980 Blackstone ..... 124/25.6
4,377,152 A 3/1983 Saunders
4,452,222 A 6/1984 Quartino et al.
4,542,732 A 9/1985 Troncoso
4,596,228 A 6/1986 Smith
4,886,038 A 12/1989 Betters
4,903,678 A 2/1990 Walker
4,919,108 A 4/1990 Larson
5,178,122 A 1/1993 Simonds
5,392,757 A 2/1995 Head et al.
5,415,149 A 5/1995 Derus et al.
5,651,355 A 7/1997 Gallops, Jr.
5,697,355 A 12/1997 Schaffer
5,718,213 A 2/1998 Gallops, Jr. et al.
5,791,324 A 8/1998 Johnson
5,983,880 A 11/1999 Saunders
(Continued)

OTHER PUBLICATIONS

Walthert; U.S. Appl. No. 62/407,697, filed Oct. 13, 2016.
Batdorf; U.S. Appl. No. 13/226,827, filed Sep. 7, 2011.
Walthert, U.S. Appl. No. 15/782,385, filed Oct. 12, 2017.

*Primary Examiner* — Jeffrey R Jastrzab
(74) *Attorney, Agent, or Firm* — Barclay Damon LLP

(57) ABSTRACT

An adjustable cable guard for archery bows includes a guard holder and a cable guard held by the guard holder to engage a cable of the bow to maintain the cable a predetermined distance from a drawstring of the bow. The guard holder includes a body having a clamping groove having a length axis and a bifurcating slit that extends from the clamping groove into the body of the holder, and the cable includes a tongue located to be matingly and slidingly received by the clamping groove. The position of the tongue within the clamping groove may be locked against movement by compressing the slit to bear surfaces of the clamping groove against surfaces of the tongue.

29 Claims, 4 Drawing Sheets

*(Amended)*

*(Amended)*

(56) References Cited

U.S. PATENT DOCUMENTS

| | | | | |
|---|---|---|---|---|
| 6,152,124 | A | 11/2000 | Gallops | F41B 5/10 124/25.6 |
| 6,176,231 | B1 | 1/2001 | Smith | |
| 6,425,385 | B1 | 7/2002 | Gallops, Jr. | |
| 6,532,945 | B1 | 3/2003 | Chattin | |
| 6,550,467 | B2 | 4/2003 | Gallops | |
| 6,634,348 | B2 | 10/2003 | Gallops | |
| 6,708,684 | B2 | 3/2004 | Chattin | |
| 6,722,354 | B1 | 4/2004 | Land | |
| 6,904,900 | B2 | 6/2005 | Gallops | |
| 7,793,646 | B2 | 9/2010 | Cooper | |
| 8,028,685 | B2 * | 10/2011 | Clark | F41B 5/10 124/25.6 |
| 8,371,283 | B2 | 2/2013 | Grace et al. | |
| 8,402,960 | B2 | 3/2013 | McPherson | |
| 8,424,511 | B2 | 4/2013 | Grace, Jr. et al. | |
| 8,485,169 | B2 | 7/2013 | Dahl, II | |
| 8,616,189 | B2 | 12/2013 | McPherson et al. | |
| 8,651,097 | B2 | 2/2014 | Grace, Jr. et al. | |
| 8,671,929 | B2 | 3/2014 | McPherson | |
| 8,746,219 | B2 | 6/2014 | Anselmo | |
| 8,746,220 | B2 | 6/2014 | McPherson et al. | |
| 8,784,628 | B2 | 7/2014 | Grace, Jr. et al. | |
| 8,813,737 | B2 | 8/2014 | Langley | |
| 8,820,304 | B2 | 9/2014 | Batdorf | |
| 8,950,388 | B2 | 2/2015 | McPherson | |
| 9,291,422 | B1 | 3/2016 | Gold et al. | |
| 2003/0056780 | A1 * | 3/2003 | Gallops, Jr. | 124/92 |
| 2009/0165766 | A1 | 7/2009 | Evans | |
| 2010/0101549 | A1 | 4/2010 | Grace et al. | |
| 2010/0132685 | A1 | 6/2010 | De Sousa | |
| 2011/0073090 | A1 | 3/2011 | McPherson | |
| 2012/0042861 | A1 | 2/2012 | Anselmo | |
| 2013/0055995 | A1 | 3/2013 | Batdorf | |
| 2013/0055997 | A1 | 3/2013 | Badgerow | |
| 2013/0061838 | A1 | 3/2013 | Gordon et al. | |
| 2014/0299116 | A1 | 10/2014 | Yehle | |
| 2015/0027425 | A1 | 1/2015 | Yehle | |
| 2015/0153133 | A1 | 6/2015 | McPherson | |
| 2017/0184370 | A1 | 6/2017 | McPherson | |

* cited by examiner

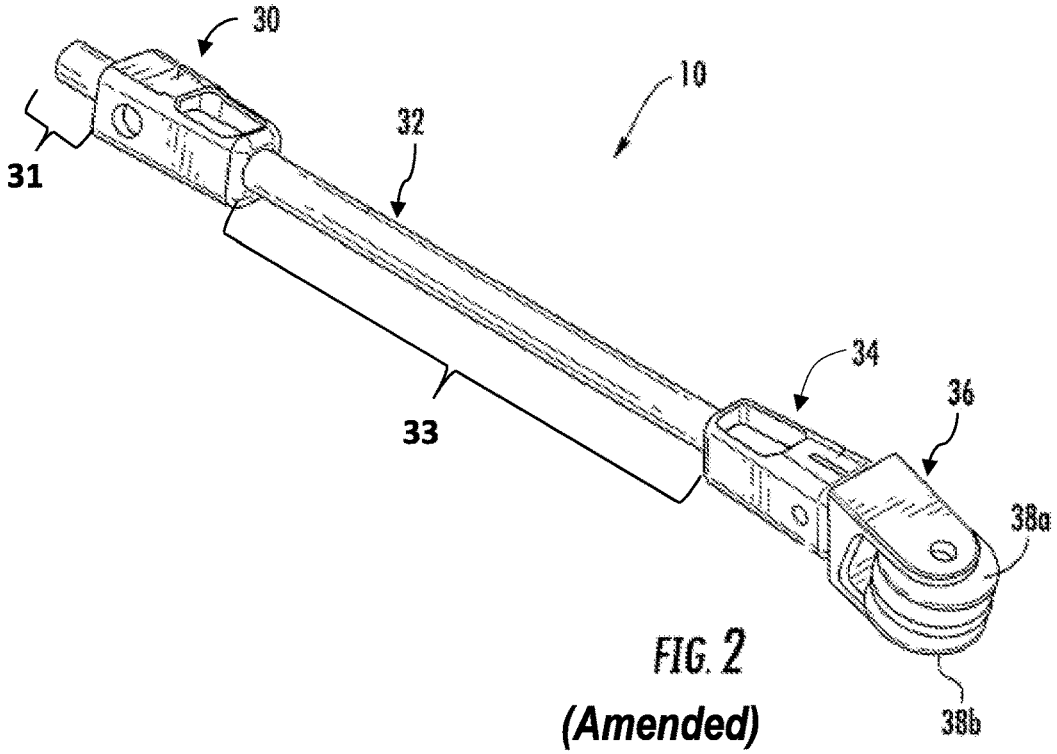
FIG. 2
(Amended)
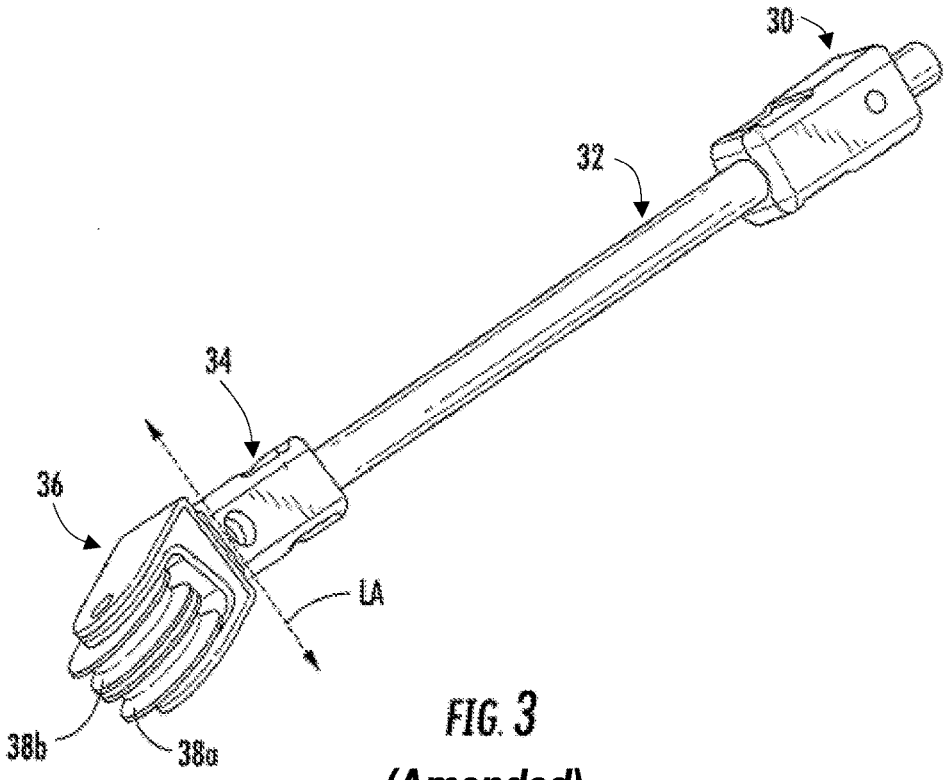
FIG. 3
(Amended)

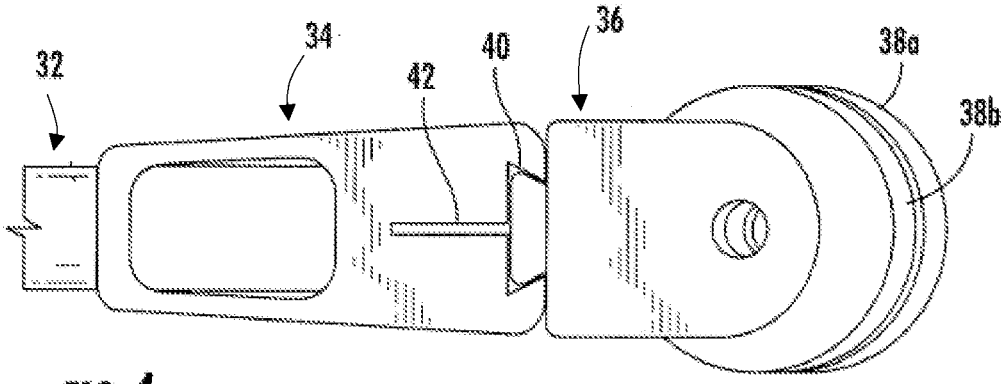
FIG. 4
(Amended)
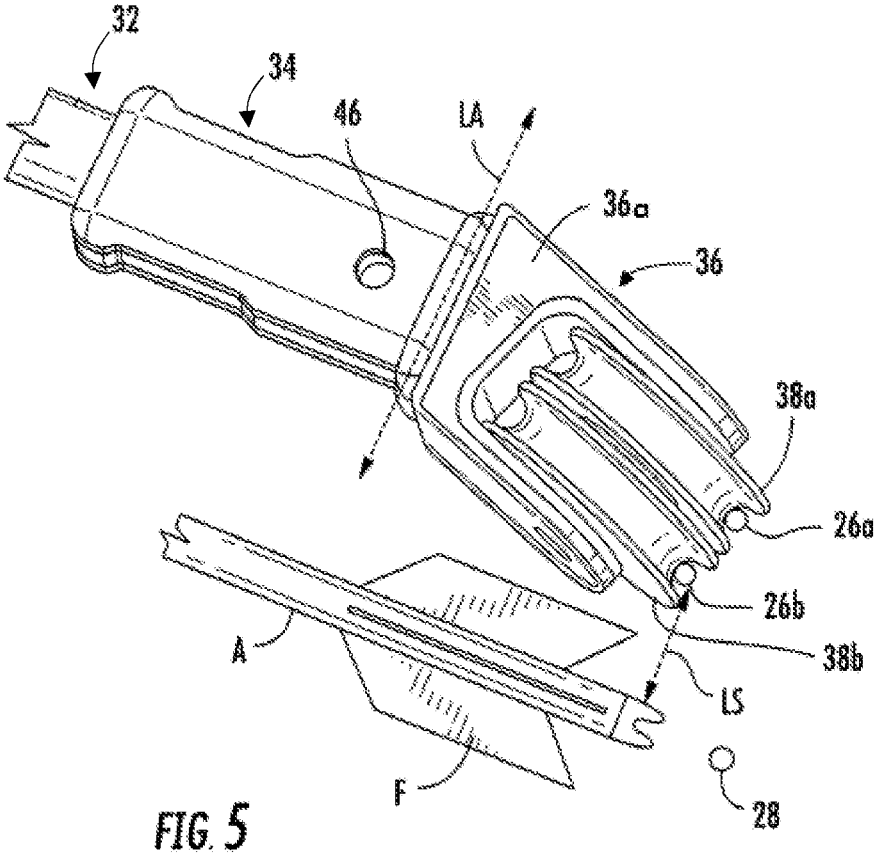
FIG. 5
(Amended)

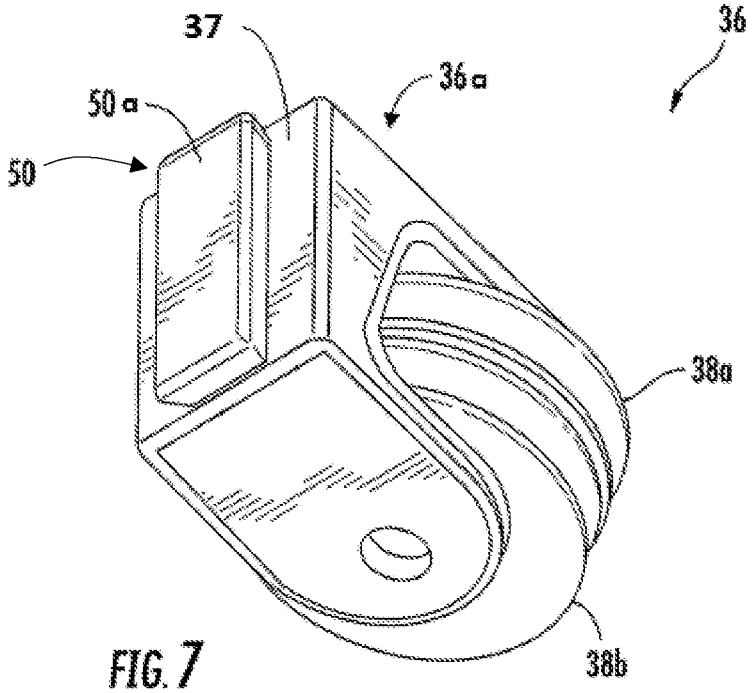
FIG. 7
(Amended)

CABLE GUARD SYSTEM FOR ARCHERY BOWS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD

This disclosure relates to the field of cable guards for archery bows. More particularly, this disclosure relates to a roller cable guard that enables quick and easy adjustability of the position of the cable guard so that the cable guard may be readily adjusted to desirably clear the fletching on the arrow.

BACKGROUND

Compound bows often include a cable guard to hold the cables out of the path of the arrow. One popular type of cable guard is a roller cable guard that uses one or more rollers or pulleys to receive the cables of the bow. Conventional cable guards of this type are installed and often positioned to maintain the cables of the bow to just clear the fletching on an arrow of the largest standard size. The fletching on the arrow is provided to stabilize the flight of the arrow and is generally present as fins, vanes, or the like on the distal end (remote from the point) of the arrow.

Conventional roller cable guards work suitably with arrows of a single type having substantially uniformly dimensioned fletching. However, in the event the archer desires to shoot arrows having different fletching dimensions, the position of the cable guard as set for the previous fletching can be disadvantageous. For example, insufficient arrow clearance will cause contact between the cables and the fletching and detrimentally affect the flight of the arrow. Alternatively, excessive arrow clearance may cause the cables to track incorrectly on the wheels and/or creates unnecessary side torque on the wheels which can adversely affect bow action. Any of these can potentially result in serious personal injury and/or damage to the bow, and are otherwise disadvantageous. Conventional cable guards may be re-installed to be suitable with differently sized arrows, but such is cumbersome and time consuming.

Accordingly, what is desired is an archery cable guard that enables quick and easy adjustability of the position of the cable guard so that the cable guard may be readily adjusted to desirably clear the fletching on the arrow.

SUMMARY

The above and other needs are met by an adjustable cable guard for archery bows. In one embodiment, the guard includes a guard holder and a cable guard held by the guard holder to engage a cable of the bow to maintain the cable a predetermined distance from a drawstring of the bow.

The guard holder includes a body having an open ended clamping groove having a length axis and a bifurcating slit that extends from the clamping groove into the body of the holder. The width of the clamping groove may be changed by application and removal of a compressive force to the slit.

The cable guard includes a surface to bear against the cable of the bow and a tongue located to be matingly and slidingly received by the clamping groove of the guard holder. The tongue may move along the length of the groove to enable adjustment of the position of the cable guard relative to the clamping groove to position the cable at a predetermined spacing from the drawstring of the bow. The position of the tongue within the groove may be locked against movement by compressing the slit to bear surfaces of the clamping groove against surfaces of the tongue to clamp the tongue against movement and thereby maintain the cable at the predetermined spacing from the drawstring of the bow.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein:

FIGS. 2 and 3 are perspective views of the adjustable roller guard system of FIG. 1.

FIGS. 4 and 5 are close-up views of a portion of the adjustable roller guard system of FIG. 1.

FIG. 7 is a detailed view of a guard component of the adjustable roller guard system of FIG. 1.

DETAILED DESCRIPTION

Figure 1:
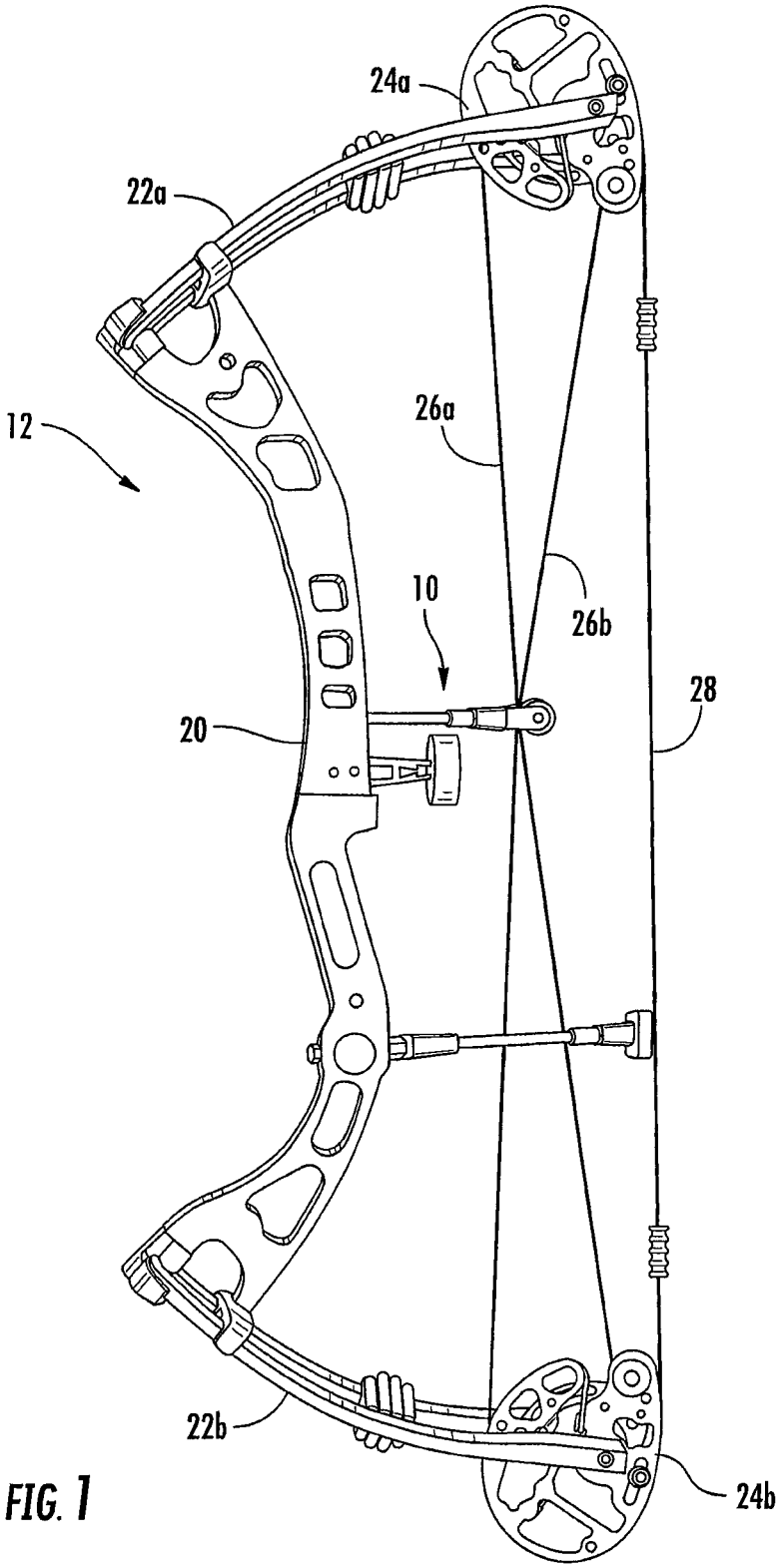
FIG. 1 is a perspective view of an archery bow having an adjustable roller guard system according to a preferred embodiment of the disclosure.

With reference to FIG. 1, there is shown an adjustable roller guard system 10 for use with a compound archery bow 12 according to a preferred embodiment of the disclosure.

The bow 12 includes a handle or riser 20, limbs 22a and 22b, cams or wheels 24a and 24b, cable portions 26a and 26b, and drawstring 28.

The adjustable roller guard system 10 includes a riser mount 30, a rod 32, a guard holder 34, and a cable guard 36 having rollers 38a and 38b. For low weight and stiffness, the riser mount 30, rod 32, holder 34, and guard 36 may be made of carbon fiber or the like.

The system 10 is configured so that the lateral position of the cable guard 36 may be laterally adjusted along a lateral axis LA of the roller guard system 10 that is substantially perpendicular to the length axis of the rod 32 (FIG. 3) to maintain the cable portions 26a and 28a of the bow 12 at a desired lateral spacing LS from the drawstring 28 (FIG. 5). In this regard, the desired lateral spacing LS is typically a spacing selected so that the cable portions 26a and 26b just clear the fletching on an arrow being shot by the bow 12 using the drawstring 28. For example, a clearance of from about 1/16 to about 5/16 of an inch is generally desired.

The rod 32 may be mounted directly to the riser 20 as by apertures or the like located on the riser 20, but it is preferred to utilize the mount 30. The mount 30 serves to stiffen the connection between the rod 32 and the riser 20 and enables quick attachment and detachment of the guard system 10 to the bow 12. *In an embodiment, the rod 32 can have a first portion or projection 31 (FIG. 2) extending from the mount 30 and configured to be inserted into an aperture located on the riser 20 and a second portion or extension 33 (FIG. 2) connecting the mount 30 to the guard holder 34.* The guard holder 34 is frictionally retained on the distal end of the rod 32 and the cable guard 36 is frictionally retained on the guard holder [36] *34*. The rollers 38a and 38b are rotationally mounted on the cable guard 36.

The guard holder 34 and the cable guard 36 are configured to enable adjustment of the position of the cable guard 36 relative to the guard holder 34. As shown in FIGS. 3 and 5, this adjustment is along a lateral adjustment axis LA. To enable the adjustment, the guard holder 34 is configured to movably receive a portion of the cable guard 36 for adjustment of the position of the cable guard 36, and to be clampable to hold the cable guard 36 against movement once it is desirably located.

Figure 6:
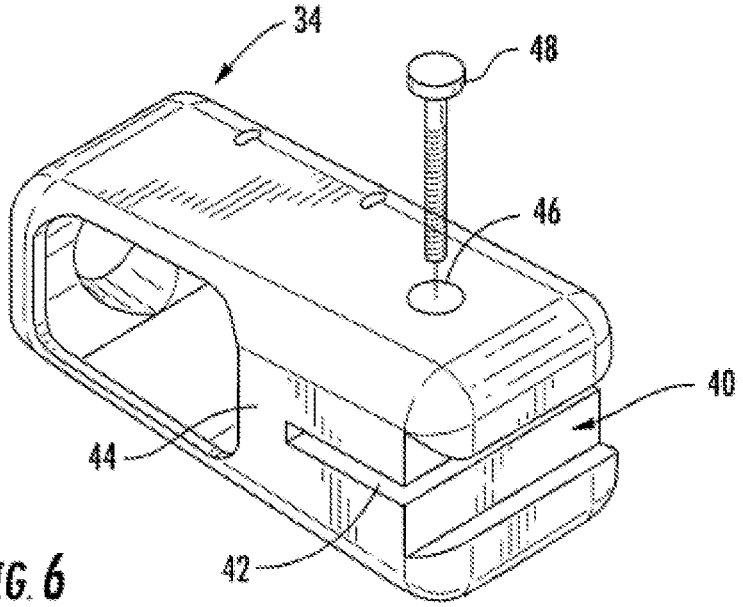
FIG. 6 is a detailed view of a holder component of the adjustable roller guard system of FIG. 1.

With reference to FIG. 6, the guard holder 34 includes a distal end configured to define an open ended clamping groove 40 and a bifurcating slit 42 that extends from the clamping groove 40 into a distal body 44 of the holder 34. The clamping groove 40 may preferably have a trapezoidal cross-sectional shape. The groove 40 is preferably open on each end, but may be open on just one end. The slit 42 enables adjustment of the width of the clamping groove 40.

The width of the clamping groove 40 may therefore be adjusted from a minimal width by fully compressing the slit 42 or to a maximum width by having no compression applied to the slit 42, in which case the clamping groove 40 may expand in width up to the flexibility or elasticity of the material used to provide the holder 34. As will be observed, when the guard holder 34 is installed on the rod 32 with the system 10 installed on the bow 12, the length axis of the clamping groove 40 corresponds to the lateral adjustment axis LA.

Compressive force may be applied to the slit 42, for example, by providing a bore 46 into the distal body 44 that extends substantially perpendicular to and spans the slit 42 and utilizing a fastener extended into the bore 46 to compress the slit 42. For example, a terminal end of the bore 46 may be threaded and threadably receive a fastener, such as a bolt 48, having a head that engages a portion of the distal body 44 opposite the terminal end 46 of the bore 46. Thus, tightening the bolt 48 will compress the slit 42.

With reference to FIG. 7, the cable guard 36 includes*: (i)* a *support 36a that supports rollers 38a, 38b, wherein the support 36a has a surface 37 located opposite of the rollers 38a, 38b; and (ii) a protrusion or* tongue 50 *extending from the surface 37, wherein the tongue 50 has a top surface 50a, and the tongue 50 is* configured to be matingly and slidingly received by the clamping groove 40. As seen, the tongue 50 is of substantially the same cross-sectional shape as the groove 40 and may be slidingly inserted from one of the open ends of the groove 40.

As situated, the tongue 50 may move along the length of the groove 40, which enables the tongue to move along the lateral adjustment axis LA, thus enabling adjustment of the cable guard 36 along the lateral adjustment axis LA. The position of the tongue 50 within the groove 40 may be locked against movement by compressing the slit 42 such as described above to bear surfaces of the clamping groove 40 against surfaces of the tongue 50 to clamp the tongue 50 in a desired position.

Thus, in this manner, the lateral position of the cable guard 36 may be adjusted along the lateral axis LA to position and maintain the cable portions 26a and 28a of the bow 12 at the desired lateral spacing LS from the drawstring 28 and the fletching of the arrow. In the event the archer desires to change to an arrow having different fletching dimensions, the position of the cable guard 36 may be readily changed.

In alternate embodiments of the invention, the tongue may be located on the holder and the groove and slit located on the guard. Additionally, other mechanisms may be used which allow for lateral adjustment of a cable guard relative to the position of a holder.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. An adjustable cable guard system for an archery bow, comprising:

a guard holder and a cable guard held by the guard holder to engage a cable of the *archery* bow to maintain the cable a [predetermined] *desired* distance from a drawstring of the *archery* bow, *wherein the cable is moveable in a plane to launch a projectile along a shooting axis, wherein the plane extends vertically when the archery bow is held vertically;*

*wherein* the guard holder [comprising] *comprises* a body [having] *defining* a [clamping] groove having a *length extending along a* length axis [and a bifurcating slit that extends from the clamping groove into the body of the holder], *wherein the length axis intersects with the plane when guard holder is coupled to the archery bow*,

[wherein the width of the clamping groove may be changed by application and removal of a compressive force to the slit,] and

*wherein* the cable guard comprises a *guard* surface *configured* to bear against the cable of the *archery* bow and a tongue [located] *configured* to be matingly and slidingly received by the [clamping] groove, wherein the tongue [may move] *is configured to slide* along the length of the groove to enable adjustment of [the] *a* position of the cable guard *and the guard surface* relative to the [clamping groove] *guard holder* to position the cable at a [predetermined spacing] *desired distance* from the drawstring of the *archery* bow, [and]

*wherein the adjustment occurs along the length axis independent of any movement of the cable guard relative to the guard holder along the shooting axis, and*

*wherein, during the adjustment, the tongue remains at least partially positioned within the groove,* wherein*, when* the [position of the tongue] *tongue is at least partially positioned* within the [clamping] groove [may], *the tongue is configured to* be locked against movement by compressing [the slit] *together the body and the tongue so as* to bear [surfaces] *a surface* of the [clamping groove] *body* against [surfaces] *a surface* of the tongue to clamp the tongue against movement and thereby maintain the cable at the [predetermined spacing] *desired distance* from the drawstring of the *archery* bow.

2. The *adjustable* cable guard system of claim 1, wherein the *guard* holder includes a bore extending into the body [that extends substantially perpendicular to and spans the slit], and *the adjustable cable guard system comprises* a fastener that is extended into the bore and rotated to compress [the slit] *together the body and the tongue*.

3. The *adjustable* cable guard system of claim 1, wherein the cable guard comprises a roller guard.

4. The *adjustable* cable guard system of claim 1, further comprising a rod located to extend outwardly from the archery bow, wherein the *guard* holder is positioned on a distal end of the rod.

5. The *adjustable* cable guard system of claim 1, wherein the [predetermined spacing] *desired distance* of the cable from the drawstring is selected so that the cable clears the [Retching] *fletching* on an arrow being shot by the bow using the drawstring by a distance of from about 1/16 of an inch to about 5/16 of an inch.

6. An archery bow, comprising:

a riser, limbs extending from opposite ends of the riser, a wheel rotatably mounted on each of the limbs, a cable portion extending around each of the wheels, a drawstring connected to each of the wheels and offset from the cable portions, *wherein the drawstring is moveable in a plane to launch a projectile along a shooting axis, wherein the plane extends between the wheels;* and a cable guard system [for] *configured to* adjustably [positioning] *position* the cable portions at a desired offset from the drawstring and [maintaining] *maintain* the cable portions at the desired offset, the cable guard system comprising [a rod extending outward from the riser generally toward the drawstring,] a guard holder [mounted to the rod] *coupled to the riser*, and a cable guard *configured to be* adjustably [positionable] *positioned* on the guard holder to engage the cable portions,

*wherein* the guard holder [comprising] *comprises* a body [having] *defining* a [clamping] groove having a *length extending along a* length axis [and a bifurcating slit that extends from the clamping groove into the body of the holder], *the length axis intersecting with the plane*,

[wherein the width of the clamping groove may be changed by application and removal of a compressive force to the slit, and]

*wherein* the cable guard comprises a *guard* surface *configured* to bear against the cable portions of the *archery bow* and a tongue [located] *configured* to be matingly and slidingly received by the [clamping] groove, wherein the tongue [may move] *is configured to be slid* along the length of the groove to enable adjustment of [the] *a* position of the cable guard *and the guard surface* relative to the [clamping groove to position the cable portions, and] *guard holder without requiring any movement of the cable guard relative to the guard holder along the shooting axis, wherein the tongue remains at least partially positioned within the groove during the adjustment,* wherein [the position of the tongue], *when the tongue is at least partially positioned* within the [clamping] groove [may], *the tongue is configured to* be locked against movement [by compressing the slit] *as a result of a compression of the body and the tongue together so as* to bear [surfaces] *a surface* of the [clamping groove] *body* against [surfaces] *a surface* of the tongue to clamp the tongue against movement and thereby maintain the [positions of cable portions] *desired offset*.

7. The *archery* bow of claim 6, wherein the *guard* holder includes a bore extending into the body [that extends substantially perpendicular to and spans the slit], and *the archery bow comprises* a fastener that is extended into the bore and rotated to compress [the slit] *together the body and the tongue*.

8. The *archery* bow of claim 6, wherein the cable guard comprises a roller guard.

9. The *archery* bow of claim 6, wherein the [clamping] groove is open on both ends thereof.

*10. The adjustable cable guard system of claim 1, wherein:*

*the groove comprises a linear shape; and*

*the sliding of the tongue comprises a non-rotational motion.*

*11. The archery bow of claim 6, wherein:*

*the groove comprises a linear shape; and*

*the sliding of the tongue comprises a non-rotational motion.*

*12. A cable guard system comprising:*

*a mount configured to be coupled to an archery bow, wherein the archery bow comprises a plurality of limbs, at least one cable coupled to the limbs, and a drawstring coupled to the limbs, wherein the drawstring is configured to move within a plane during shooting of the archery bow to launch a projectile along a shooting axis, wherein the plane is vertical when the archery bow is vertically held; and*

*a guard holder coupled to the mount, the guard holder comprising:*

*a first surface defining a groove extending along an axis, wherein the axis intersects with the plane when the cable guard system is coupled to the archery bow; and*

*a second surface defining an opening configured to at least partially receive a fastener,*

*wherein the groove comprises a linear shape;*

*wherein the fastener is configured to be moved between first and second positions relative to a portion of the second surface; and*

*a guard comprising a tongue and a cable engager, wherein, when the cable guard system is coupled to the archery bow, the tongue is configured to:*

*at least partially fit within the groove;*

*slide along the first surface relative to the plane, wherein the sliding comprises a non-rotational motion; and*

*enable adjustment of a position of the guard and cable engager relative to the guard holder;*

*wherein the adjustment occurs without requiring any movement of the guard relative to the guard holder along the shooting axis,*

*wherein, when the fastener is in the first position, the tongue is configured to slidably cooperate with the first surface to enable a first location of the cable engager to be adjusted relative to the plane when the cable guard system is coupled to the archery bow,*

*wherein the tongue remains at least partially positioned within the groove during the adjustment,*

*wherein, when the fastener is in the second position after the adjustment, the tongue and the first surface are compressed together to cause the cable engager to be secured in a second location relative to the plane when the cable guard system is coupled to the archery bow.*

*13. The cable guard system of claim 12, comprising at least one projection extending from the mount, wherein the projection is configured to be inserted into a cavity defined by the archery bow.*

*14. The cable guard system of claim 12, comprising an extension connecting the mount to the guard holder.*

*15. The cable guard system of claim 12, wherein the first surface comprises:*

*a stopping surface; and*

*a plurality of guide surfaces to the stopping surface, wherein the guide surfaces are spaced apart from each other, and the stopping surface and guide surfaces collectively define the groove.*

*16. The cable guard system of claim 12, wherein:*

*the guard comprises a surface, wherein the tongue extends from the surface, wherein the surface extends in a first plane; and*

*the tongue comprises a top surface that extends in a second plane located above the first plane.*

*17. The cable guard system of claim 12, wherein:*

*the guard holder comprises a dimension extending along a longitudinal axis;*

*the dimension comprises a center; and*

*the guard holder defines a bifurcating slit extending from the groove, along the longitudinal axis, toward the center.*

*18. A cable guard system comprising:*

*a coupler portion configured to be coupled to an archery bow, wherein the archery bow comprises:*

*a plurality of limbs;*

*at least one cable coupled to the limbs; and*

*a drawstring coupled to the limbs, wherein the drawstring is configured to move within a plane to launch a projectile along a shooting axis during shooting of the archery bow, wherein the plane is vertical when the archery bow is vertically held; and*

*a plurality of portions configured to mate with each other;*

*wherein the portions are configured to be coupled to the coupler portion,*

*wherein a first one of the portions comprises a first surface that defines a groove extending along an axis, wherein the axis intersects with the plane and the shooting axis when the cable guard system is coupled to the archery bow,*

*wherein a second one of the portions comprises a protrusion, wherein the protrusion is configured to at least partially fit within the groove,*

*wherein the protrusion is configured to be slidably engaged with the first surface during a first mode to enable adjustable positioning of the first portion relative to the second portion,*

*wherein one of the first and second portions comprises a cable engager configured to engage the at least one cable,*

*wherein at least one of the first and second portions is configured to be coupled to a fastener, and*

*wherein, when the cable guard system is coupled to the archery bow, the coupled fastener is configured to be moved to cause a change from:*

*(a) the first mode in which the protrusion has freedom to slidably cooperate with the first surface to enable the cable engager to be repositioned relative to the plane; to:*

*(b) a second mode in which the protrusion and the first surface are secured together to cause the cable engager to have a secured position relative to the plane,*

*wherein the change occurs independent of any movement of the first portion relative to the second portion along the shooting axis,*

*wherein, during the change, the protrusion remains at least partially positioned within the groove.*

*19. The cable guard system of claim 18, wherein the archery bow comprises a riser which supports the limbs, and the coupler portion comprises a riser mount.*

*20. The cable guard system of claim 18, wherein the drawstring is configured to engage an arrow so the arrow at least temporarily extends in the plane.*

*21. The cable guard system of claim 18, wherein the first portion comprises a guard holder, and the second portion comprises a cable guard.*

*22. The cable guard system of claim 18, wherein the first portion comprises a cable guard, and the second portion comprises a guard holder.*

*23. The cable guard system of claim 18, wherein at least one of the first and second portions comprises: (a) a support; and (b) at least one roller which is rotatably coupled to the support, wherein:*

*the at least one roller comprises the cable engager;*

*the at least one roller is rotatable about a second axis; and*

*the second axis intersects with the plane.*

*24. The cable guard system of claim 18, wherein:*

*at least one of the first and second portions comprises a second surface defining a bore configured to at least partially receive the fastener;*

*the fastener is configured to be at least partially inserted into the bore;*

*the fastener is configured to be moved between first and second positions relative to a point on the second surface;*

*the first position is associated with the first mode; and*

*the second position is associated with the second mode.*

*25. The cable guard system of claim 18, wherein:*

*during the first mode, the first and second portions are configured to have a sliding movement relative to each other; and*

*at least one of the first and second portions is configured to limit the sliding movement during the first mode.*

*26. The cable guard system of claim 25, wherein:*

*the first portion comprises a guard holder;*

*the guard holder comprises the at least one portion configured to limit the sliding movement; and*

*the groove comprises a plurality of ends, only one of which is open.*

*27. The cable guard system of claim 18, wherein:*

*the slidable cooperation of the protrusion with the first surface comprises a non-rotational motion; and*

*the groove comprises a linear shape.*

*28. The cable guard system of claim 18, wherein:*

*the first portion comprises a guard holder;*

*the second portion comprises a cable guard;*

*the guard holder comprises a dimension extending along a longitudinal axis;*

*the dimension comprises a center; and*

*the guard holder defines a bifurcating slit extending from the groove, along the longitudinal axis, toward the center.*

*29. The adjustable cable guard system of claim 1, wherein the tongue is configured to slide along the groove to enable adjustment of a position of the cable guard, guard surface, and tongue, moving as a single unit, relative to the guard holder.*

* * * * *